Jan. 15, 1935. G. F. ZELLHOEFER 1,987,655
ABSORBER FOR ABSORPTION REFRIGERATION PLANTS
Original Filed Jan. 12, 1933
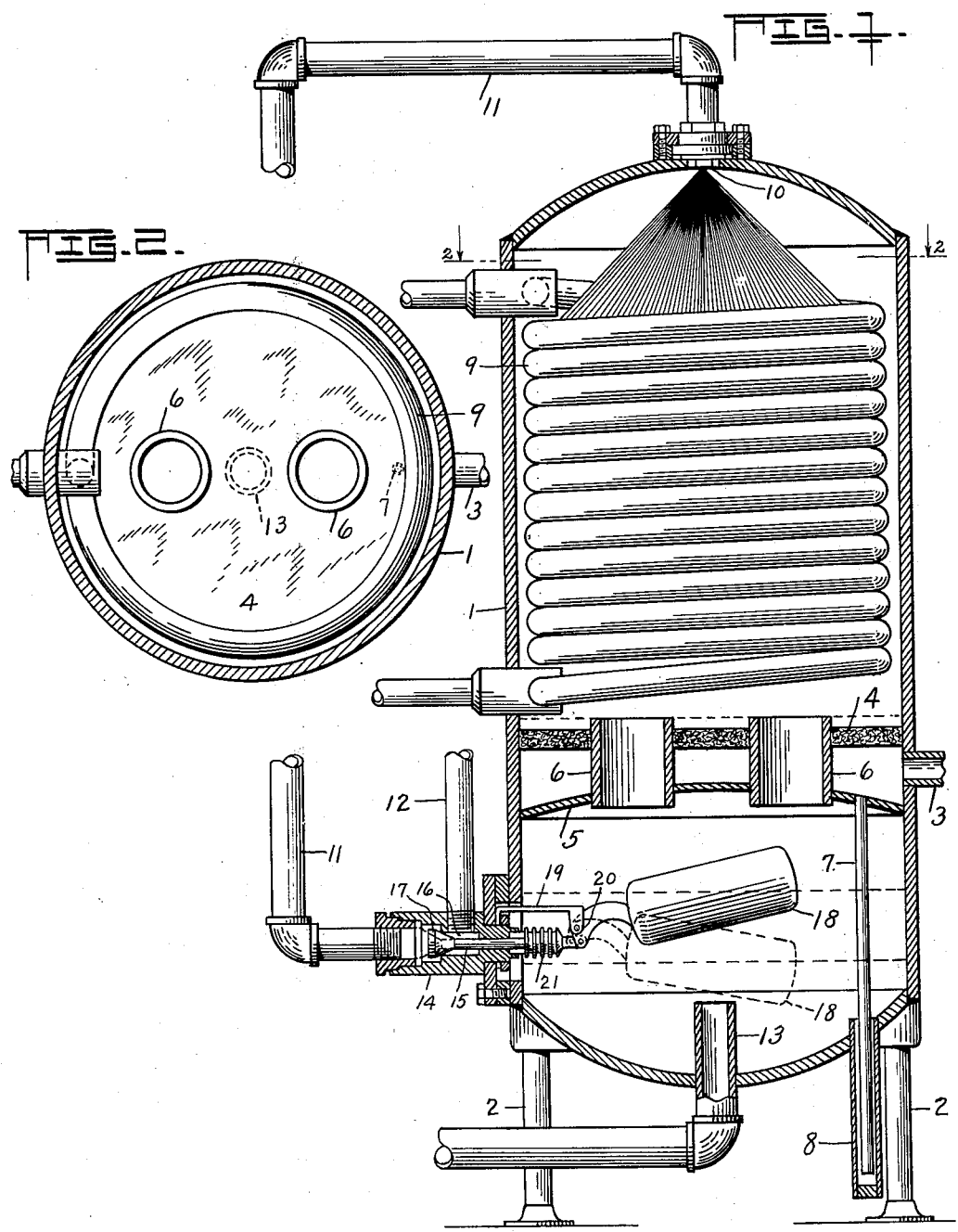
INVENTOR.
GLENN F. ZELLHOEFER
BY
ATTORNEYS.

Patented Jan. 15, 1935

1,987,655

UNITED STATES PATENT OFFICE 1,987,655

ABSORBER FOR ABSORPTION REFRIGERATION PLANTS

Glenn F. Zellhoefer, Bloomington, Ill.

Original application January 12, 1933, Serial No. 651,306. Divided and this application August 28, 1933, Serial No. 687,046

3 Claims. (Cl. 261—122)

This invention relates to absorption refrigeration plants and more particularly to an absorber forming a part of the refrigeration system. This application is a division of this applicant's prior co-pending application Serial No. 651,306, filed January 12, 1933.

Absorption refrigeration plants include a solvent and a refrigerant; a still to distill the refrigerant from the solvent; a condenser to condense the gaseous refrigerant to a liquid state; an evaporator in which the liquid refrigerant is vaporized at reduced pressure; an absorber in which the gaseous refrigerant is dissolved in the solvent; a system of heat exchange; and means effecting or causing circulation.

It is an object of this invention to provide an absorber for such a system which is simple in construction and efficient in operation. It is a further object of this invention to design an absorber to effect the solution of the refrigerant in the solvent by means of both a spray of the weak liquor and the bubbling of the gaseous refrigerant through the solution.

With these and other objects in view, reference is made to the accompanying sheet of drawing which illustrates an embodiment of this invention with the understanding that minor detail changes may be made without departing from the scope thereof.

Figure 1 is a view in transverse vertical section, with parts shown in elevation, of a preferred embodiment of this invention.

Figure 2 is a view in section taken on the line 2—2, Figure 1, looking in the direction of the arrows.

The absorber is preferably in the form of a metallic cylindrical casing 1 closed at each end and supported upon legs 2, as shown in Figure 1. The pipe 3 leading the gaseous refrigerant from the evaporator enters the side thereof below a horizontal partition 4 of silica dioxide which forms a porous plate. The cylindrical casing 1 below the pipe 3 is provided with a metallic diaphragm 5, dividing the casing into two chambers. This diaphragm 5 supports two or more conduits 6 which extend through and for a short distance above the upper surface of the porous plate 4 forming a means of communication between the two chambers. A drain pipe 7 is provided which communicates with the space between the plate 4 and diaphargm 5 and empties into a trap 8 which communicates with the lower chamber. A water cooling system in the form of a coil of pipe 9 surrounds the interior of the upper chamber. A spray nozzle 10 is arranged in the center of the upper cover of the cylinder 1 which communicates by means of a pipe 11, through a valve, hereinafter described, to the pipe 12 for conveying the weak liquor from the still and discharging same in a spray through nozzle 10 into the interior of the upper chamber of the casing 1.

The gaseous refrigerant from the evaporator enters the absorber between the diaparagm 5 and porous plate 4, passes up through said porous plate and the thin layer of liquor collected thereon, and is entrained in the spray of weak liquor issuing from the nozzle 10, forming a solution with the weak liquor, which, as its level rises above the conduits 6, is discharged into the lower chamber below the diaphragm 5. The solution or strong liquor is drawn from the bottom of the lower chamber through pipe 13 to the intake side of a still. Any of the liquor which may pass through the plate 4 and collect upon the diaphragm 5 flows by gravity to the lower chamber by the drain 7 and trap 8.

It is preferable to provide a float-operated valve interposed between the pipe 11 leading from the nozzle 10, and the pipe 12 leading from the still, which is controlled by the level of strong liquor in the bottom chamber of the absorber.

As shown, this float-operated valve comprises a casing 14 secured to the side of the absorber with a reciprocating valve stem 15 passing through an aperture provided in the side thereof and entering the lower chamber of the absorber. The casing 14 includes a chamber 16 in communication with the pipe 12 conveying the weak liquor from the still through the heat exchanger and residual heat coil. The chamber 16 is enlarged to form a seat for a conical valve 17 on the stem 15 and the enlarged side of the chamber is in communication with the pipe 11 leading to the nozzle 10. A float 18 is pivotally mounted upon a bracket 19 extending into the lower side of the absorber and is connected by a bell crank arm 20 to the end of the valve stem 15, which is preferably provided with a metallic bellows stuffing box 21. The parts are so arranged that when the liquid or strong liquor in the bottom chamber of the absorber reaches a predetermined level, it will cause the float 18 to rise and cause the valve head 17 to approach the seat and throttle the supply of weak liquor to the nozzle 10 until sufficient strong liquor has been drawn from the absorber to cause the float to descend and open the valve to again supply more weak liquor to the nozzle 10.

This float-operated valve actuated by the level of the strong liquor in the absorbent controls the flow of weak liquor from the still to the absorber and thereby prevents the accumulation of an excess of strong liquor. The float-operated valve also prevents the flooding of the absorber in the event the circulation is stopped.

What I claim is:

1. An absorber for a non-intermittent absorption refrigeration plant comprising a chamber, means for spraying a solvent through the top of the chamber, means for delivering a gaseous refrigerant into the chamber, a porous plate extending across the chamber above the point of entry of said gaseous refrigerant, through which the refrigerant must pass before being entrained in the solvent spray, means serving to maintain a layer of liquid solvent on said porous plate and for delivering the solution formed by the bubbling of the refrigerant through said liquid layer to the bottom of said chamber, and means for withdrawing the solution from the bottom of said chamber.

2. An absorber for a non-intermittent absorption refrigeration plant comprising a chamber, means for spraying a solvent through the top of the chamber, means for delivering a gaseous refrigerant into the chamber, a porous plate extending across the chamber above the point of entry of said gaseous refrigerant, through which the refrigerant must pass before being entrained in the solvent spray, means serving to maintain a layer of liquid solvent on said porous plate and for delivering the solution formed by the bubbling of the refrigerant through said liquid layer to the bottom of said chamber, and means for withdrawing the solution from the bottom of said chamber, an imperforate diaphragm below the entry of the gaseous refrigerant through which the means for delivering the solution passes, and a drain provided with a trap for conducting liquid passing through the porous plate and collecting upon the diaphragm to the bottom of the chamber.

3. The structure of claim 1 wherein the porous plate is a disc formed of silica dioxide.

GLENN F. ZELLHOEFER.